United States Patent
Keck et al.

(12) 
(10) Patent No.: US 6,450,303 B1
(45) Date of Patent: Sep. 17, 2002

(54) BRAKE DISC, ESPECIALLY FOR AN AUTOMOBILE

(75) Inventors: Volker Keck, Stuttgart; Detlef Sokolowsky, Esslingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/743,339

(22) PCT Filed: Jun. 15, 1999

(86) PCT No.: PCT/EP99/04120

§ 371 (c)(1),
(2), (4) Date: Mar. 7, 2001

(87) PCT Pub. No.: WO00/03152

PCT Pub. Date: Jan. 20, 2000

(30) Foreign Application Priority Data

Jul. 9, 1998 (DE) .......................................... 198 30 669

(51) Int. Cl.$^7$ .............................................. F16D 65/12
(52) U.S. Cl. ............................. 188/218 XL; 188/73.2; 188/218 A; 29/513
(58) Field of Search .................. 188/218 XL, 73.2, 188/264 AA, 71.6, 218 R, 250 B, 250 G, 18 A, 218 A, 58, 59; 301/105.1, 6.1–6.8; 29/513; 403/348, 405.1; 192/107 M, 107 R, 70.19, 70.2, 113.2

(56) References Cited

U.S. PATENT DOCUMENTS 3,661,235 A * 5/1972 Harrison ............... 188/218 XL
5,007,508 A   4/1991 Lacombe ................ 188/251 A
6,035,978 A   3/2000 Metzen et al. ........ 188/218 XL

FOREIGN PATENT DOCUMENTS

| DE | 1 775 685 | 9/1971 |
|---|---|---|
| DE | 35 15 512 | 10/1986 |
| DE | 44 19 754 | 12/1995 |
| DE | 44 19 757 | 12/1995 |
| DE | 44 20 758 | 12/1995 |
| EP | 0849485 | * 6/1998 |
| EP | 1118789 | * 7/2001 |

* cited by examiner

Primary Examiner—Douglas C. Butler
(74) Attorney, Agent, or Firm—Crowell & Moring LLP

(57) ABSTRACT

Brake disc for motor vehicles, with a bowl-shaped brake-disc chamber having a wall region and a bottom region, and with a disc-shaped friction ring surrounding the brake-disc chamber coaxially with respect to a common mid-axis, the friction ring having, on its inner circumference, clearances, into which projections formed on the wall region of the brake-disc chamber engage for the play-free transmission of a torque acting on the friction ring to the brake-disc chamber.

14 Claims, 5 Drawing Sheets

BRAKE DISC, ESPECIALLY FOR AN AUTOMOBILE

BACKGROUND AND SUMMARY OF THE INVENTION

The present invention relates to a brake disc, in particular for a motor vehicle, with a bowl-shaped brake-disc chamber having a wall region and a bottom region, and with a disc-shaped friction ring surrounding said brake-disc chamber coaxially with respect to a common mid-axis.

Brake discs of this type are known and are used as a component of brake systems, in particular in motor vehicles for racing. In this context, a friction ring consisting of carbon-fibre-reinforced carbon material (C/C) is connected by means of a number of connecting elements to a brake-disc chamber made of solid steel. The connecting elements, consisting of screws, spacer sleeves, nuts, sliding blocks, washers and the like, serve for transmitting torques which occur and for compensating the varying thermal expansion of the brake-disc chamber and the friction ring. This floating mounting avoids the friction ring being deformed (like an umbrella) and being subjected to mechanical stress by the brake-disc chamber which expands to a greater extent under heat. One disadvantage of this design is the high outlay in terms of cost which is caused by the multiplicity of connecting elements (for example, spacer sleeves or sliding blocks), sometimes difficult to produce, and which is taken into account in the construction of racing cars, but, for reasons of cost, cannot be allowed for in the mass manufacture of vehicles.

Furthermore, the advantage in terms of the weight of the friction-ring material C/C which can be achieved, as compared with conventional cast-iron brake discs, is cancelled again, at least in part, by the use of the many connecting elements and the solid, heavy brake-disc chamber.

German Patent Document No. DE-A 1 775 685 discloses a brake disc which consists of a hub part and of a brake ring and in which the brake ring and the disc hub have extensions and/or clearances which engage one into the other, the brake ring and hub being braced relative to one another by means of axially extending connecting elements, such as, for example, screws, rivets, bolts or the like. With this design, it is also considered necessary to use screws and rivets or bolts, with the result that the weight of the brake disc as a whole is increased.

German Patent Document No. DE 35 15 512 A1 discloses a friction ring, in particular for disc or drum brakes, which is produced entirely from ceramic. In order to achieve a rotationally fixed connection between the friction ring and brake housing in a drum brake using this friction ring, it is intended to provide the brake housing with concave projections on the inner circumference and the friction ring with convex recesses on the outer circumference, the projections and recesses engaging one into the other. For securing the two structural parts axially relative to one another, a flange is provided at the outer edge of the bowl-shaped hub, said flange having an annular groove, into which the friction ring extends. Designing the hub with a flange of this kind and introducing the friction ring with an exact fit into the annular groove of the flange must be considered as highly complicated.

U.S. Pat. No. Specification 5,007,508 discloses a brake-disc system, in which a brake disc has an inner fastening ring, on the inner circumference of which recesses are formed. The brake disc can be fastened to a brake-disc chamber in an axially floating manner. In order to ensure this fastening, quadrant pieces capable of being arranged in the recesses and, as bracing means, screws are provided. This arrangement has a multiplicity of individual parts and, for example due to the provision of screws for fastening the respective parts, has an increased weight.

The object of the present invention is, therefore, to provide a brake disc, in particular for a motor vehicle, which can be produced simply and cost-effectively from as few parts as possible and, at the same time, has as low a weight as possible.

This object is achieved by means of a brake disc characterized in that the friction ring has, on its inner circumference, clearances, into which projections formed on the wall region of the brake-disc chamber engage for the play-free transmission of a torque acting on the friction ring to the brake-disc chamber.

According to the invention, then, a brake disc is provided which has substantially fewer structural parts and a lower weight, as compared with conventional brake discs. The assembly outlay for fastening the friction ring to the brake-disc chamber is substantially lower than in the case of conventional brake discs, since no screw connections are provided. Clearances and projections can be dimensioned in a simple way, such that unimpeded radial and axial thermal expansion of the brake-disc chamber, manufactured, for example, from sheet metal, in relation to the friction ring is ensured and therefore a floating mounting of the friction ring is implemented.

Preferred refinements of the brake disc according to the invention are the subject-matter of the subclaims.

According to a preferred refinement of the brake disc according to the invention, elastically deformable parts are formed on the wall region of the brake-disc chamber in order to secure the friction ring axially in relation to the brake-disc chamber. Parts of this kind can be shaped in a simple way, for example by means of stamping, out of the wall region of the brake-disc chamber. In this case, it is possible in a simple way to provide desired axial play (with respect to the common mid-axis) between the brake-disc chamber and the friction ring. With deformable parts of this kind being produced, additional axial securing means, for example screws or bolts, can be dispensed with.

Expediently, the projections and the parts take the form of tabs which are produced by means of stamping or cutting and subsequent bending-round from portions of the wall of the brake-disc chamber. Tabs of this kind can be produced in a very cost-effective and simple way. Axial securing therefore takes place merely by the reshaping of tabs which are shaped out of the wall of the brake-disc chamber.

According to a further preferred refinement, the clearances formed in the friction ring have slot-like prolongations in their bottom region. When the projections or tabs engage into these slot-like prolongations, particularly effective torque transmission between the friction ring and brake-disc chamber can be achieved. This is because the necessary freedom of play between the tabs and the corresponding clearances of the friction ring can be produced in a very simple way, since the width of the prolongations (slot width) can be selected according to the low-tolerance sheet-metal thickness of the tabs. The unimpeded radial expansion of the tabs under heating is ensured here, too, by the prolongations being made somewhat longer in the radial direction than the tabs engaging into them.

According to a further preferred embodiment, the projections take the form of a toothed profile pressed into the wall region of the brake-disc chamber. A toothed profile of this kind, which has, in particular, rectangularly shaped teeth, can be pressed in a simple way into the wall region of the brake-disc chamber, with out the mechanical stability of said brake-disc chamber being impaired.

Expediently, the friction ring is secured axially on the brake-disc chamber by means of protrusions or pressed-out portions pressed into the wall region of the brake-disc chamber below and/or above the toothed profile. By virtue of this measure, the extent of axial play between brake-disc chamber and friction ring can be selected in a simple way. Here, too, the friction ring is secured axially on the brake-disc chamber merely by portions of the wall of said brake-disc chamber being reshaped into protrusions.

Advantageously, the friction ring is produced from a non-metallic material and the brake-disc chamber from a metallic material. Preferred materials for the friction ring are carbon-fibre-reinforced carbon materials (C/C) or fibre-reinforced composite ceramics based on silicon carbide (C/C—SiC). Materials of this kind are substantially lighter than, for example, conventional cast-iron alloys. The brake-disc chamber preferably consists of Nirosta steel sheet which has a relatively low weight along with good mechanical stability.

Preferred embodiments of the brake disc according to the invention are explained in detail by means of the drawing in which:

DETAILED DESCRIPTION OF THE DRAWINGS

Figure 7:
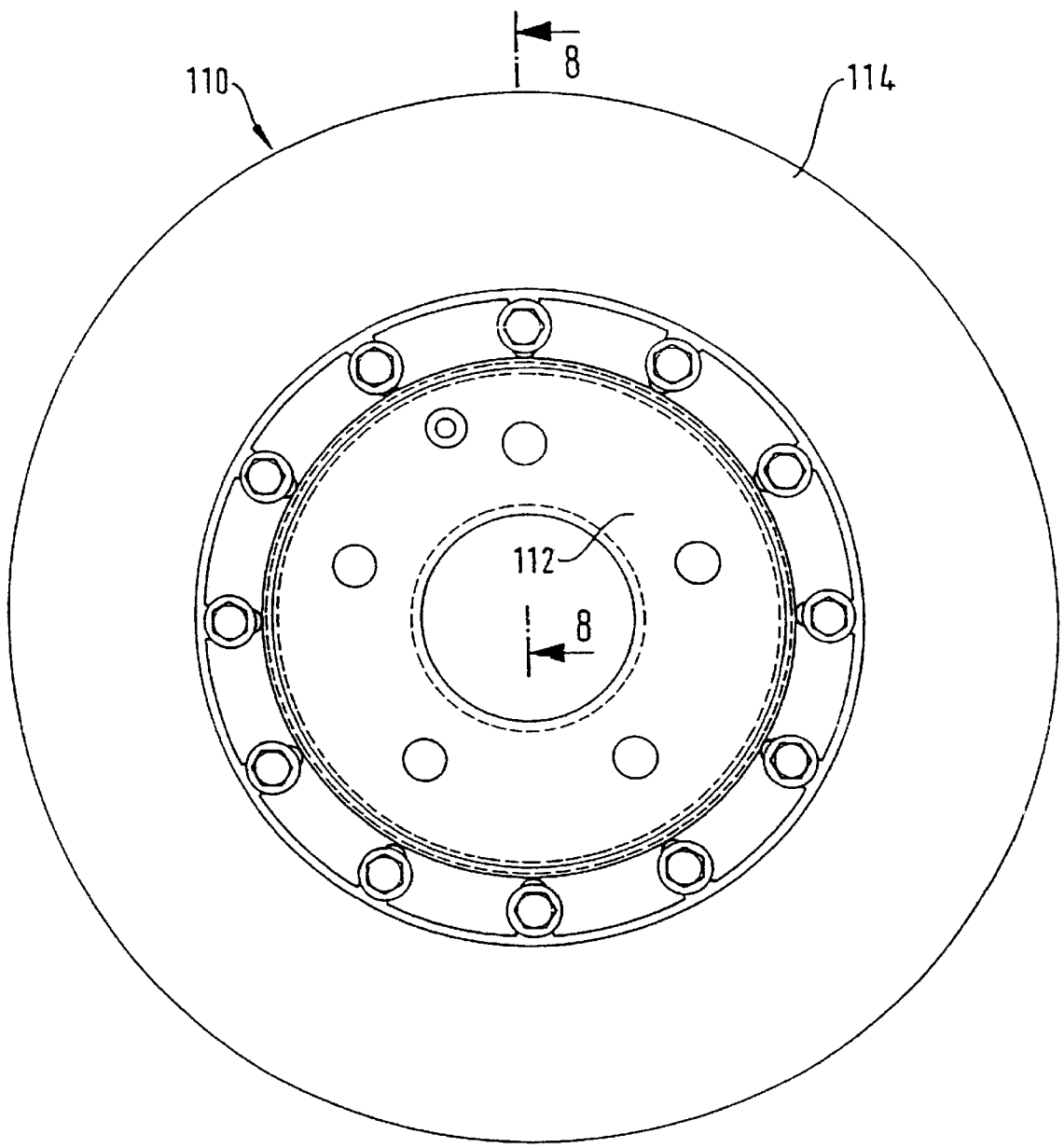
FIG. 7 shows a top view of a brake disc according to the prior art.
Figure 8:
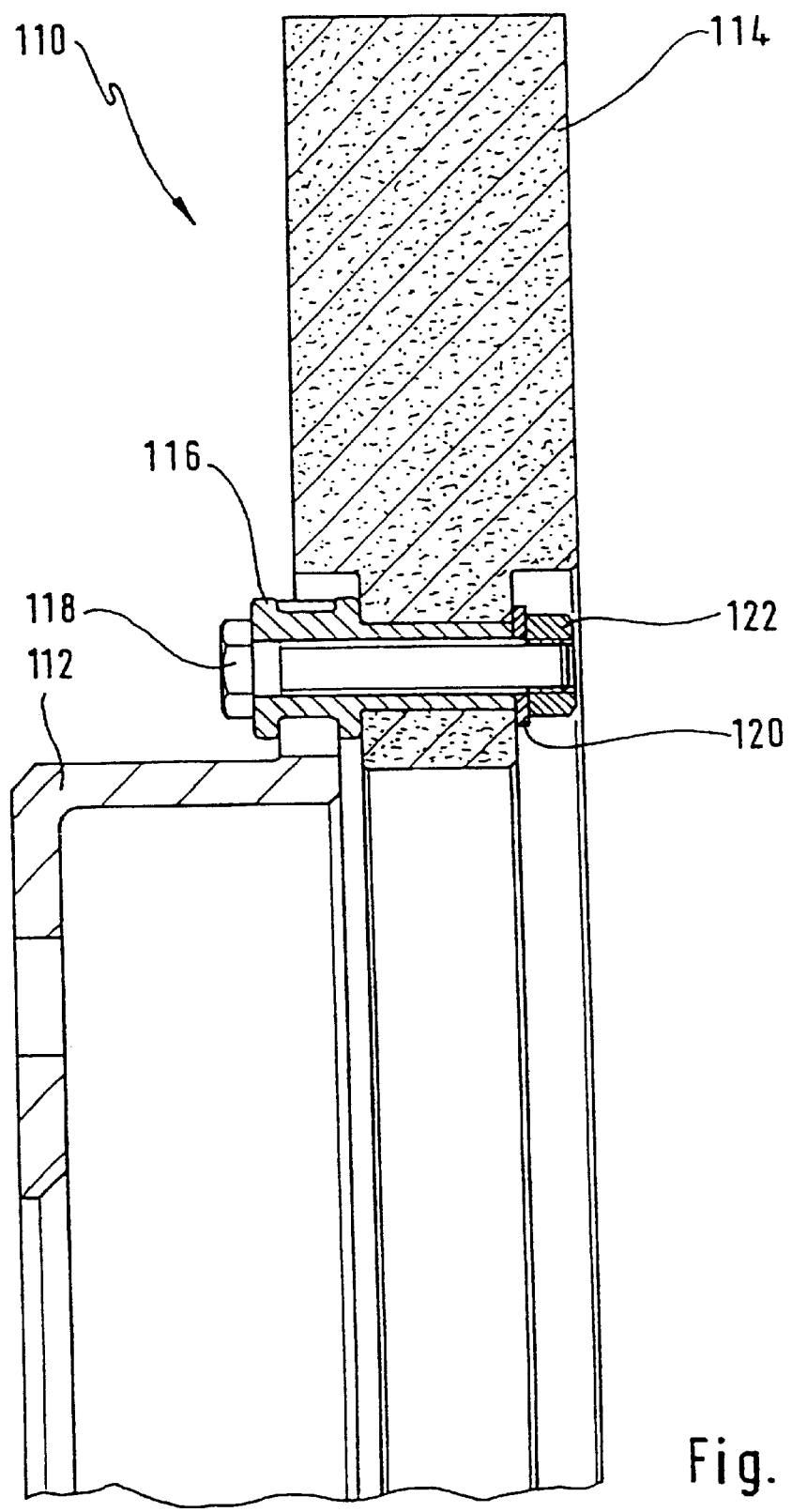
FIG. 8 shows a part cross section along the line 8—8 of FIG. 7, the prior art.

The illustrations of FIGS. 7 and 8 show diagrammatically a brake disc 110, such as is known from the prior art and is used, for example, in racing as a so-called carbon brake disc. The known brake disc 110 comprises a brake-disc chamber 112 made of solid steel and a friction ring 114 fastened to the circumference of the chamber 112 and made of carbon material. The friction ring 114 is fastened in the friction ring by means of spacer bushes 116 and corresponding bores and to corresponding clearances of the brake-disc chamber 112 by means of hexagon-head screws 118 which are inserted through the spacer bushes 116 and are secured by means of hexagon nuts 122 and washers 120. In this case, the spacer bushes 116 can slide radially in the clearances of the chamber 112, so that, together with the axial play between spacer bushes 116 and friction ring 114, a floating mounting of said friction ring 114 is achieved.

Figure 1:
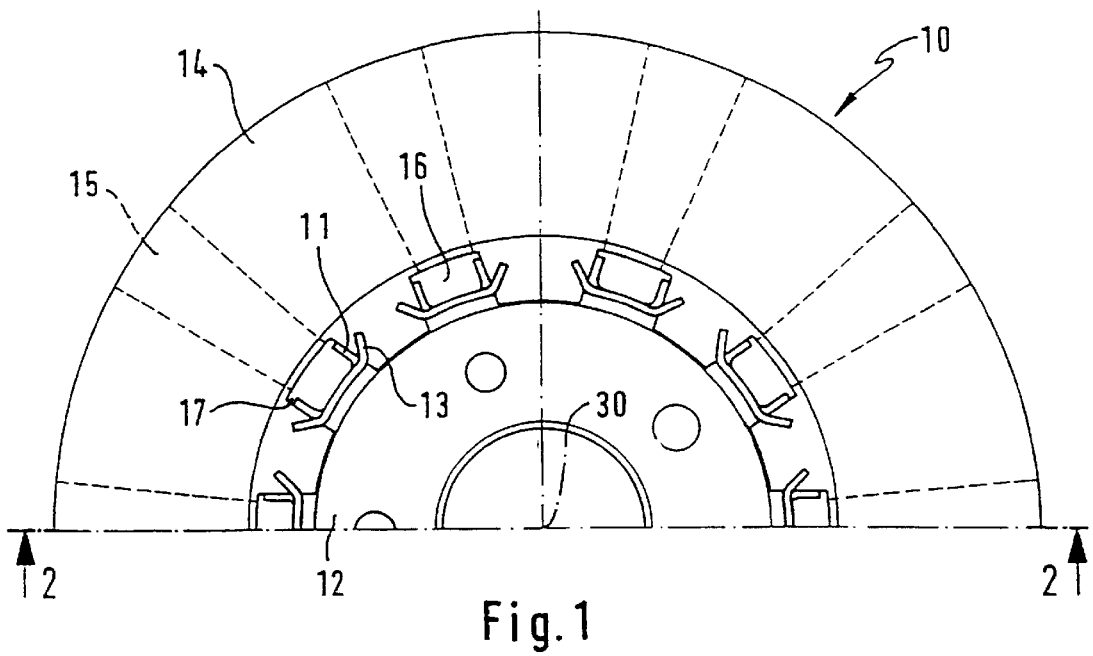
FIG. 1 shows a top view of a first embodiment of the brake disc according to the invention.
Figure 2:
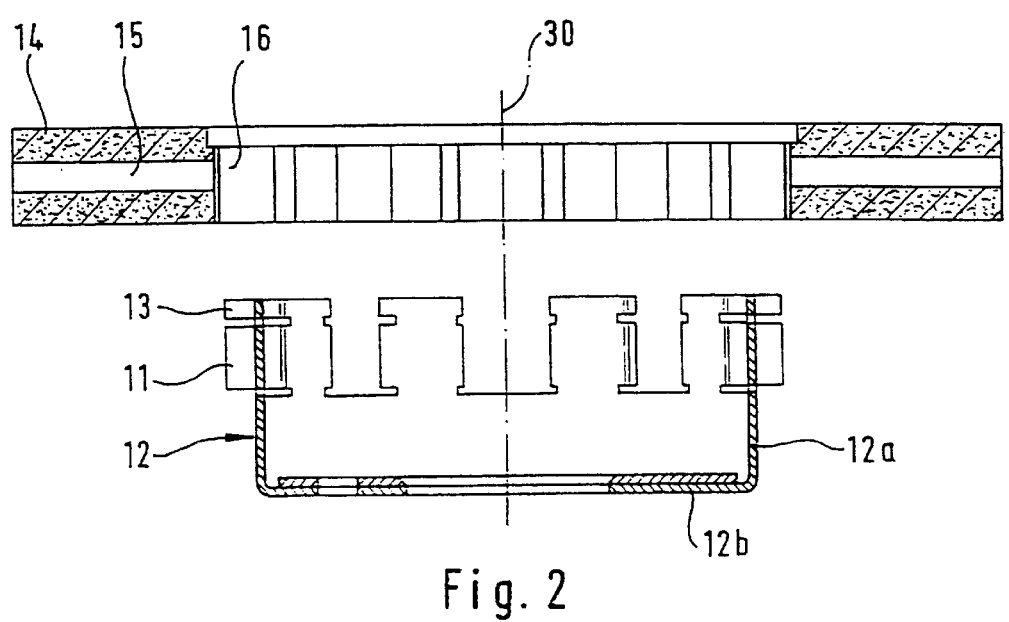
FIG. 2 shows a cross section along the line 2—2 of FIG. 1, friction ring and brake-disc chamber being illustrated in the not yet assembled state.

FIGS. 1 and 2 show a first exemplary embodiment of the present invention. In FIG. 2, here, the structural parts, brake-disc chamber 12 and friction ring 14, are illustrated separately, that is to say before they are mounted.

The brake disc 10 comprises a brake-disc chamber 12 made from Nirosta® non-rusting steel sheet and a friction ring 14 made from fibre-reinforced carbon material or preferably from fibre-reinforced composite ceramic. The friction ring 14 surrounds the brake-disc chamber coaxially with respect to a common mid-axis 30. The brake-disc chamber has a chamber wall 12a and a bottom 12b. The brake-disc chamber 12 possesses, on its chamber wall 12a, tabs or tongues 11 and 13 which are produced by cutting or stamping and subsequent bending-round and which, during the assembly of the brake disc, can be introduced into corresponding clearances 16 on the inside diameter of the friction ring 14. For introduction, the tabs or tongues 11, 13 must be in a position in which they are bent round at about 90° to the circumference of the brake-disc chamber. This state is illustrated in FIG. 1 with regard to the lower tabs 11.

After the brake-disc chamber 12 and friction ring 14 have been assembled, the upper tongues 13 are bent outwards or bent back again, so that the friction ring is secured axially with a small amount of play. This state of the tabs 13 is illustrated in FIG. 1.

A torque acting on the friction ring 14 during a braking operation is transmitted to the tongues 11, and therefore into the brake-disc chamber 12, free of play and positively, via the flanks or walls of the clearances 16. The tongues 11 are dimensioned such that a gap 17 remains between the tongue ends and the bottom of the recesses 16. Unimpeded radial thermal expansion of the brake-disc chamber 12 in relation to the friction ring 14 is thereby possible. At the same time, the inherent elasticity of the tongues 11 ensures that all the tongues come to bear uniformly on the flanks of the clearances 16 of the friction ring, even if there are any pitch errors or dimensional tolerances which may occur during the manufacture of the structural parts. Ventilation ducts 15, illustrated by broken lines, are formed with inlet orifices in the clearances 16, so that an optimum supply of cooling air can be achieved.

Figure 3:
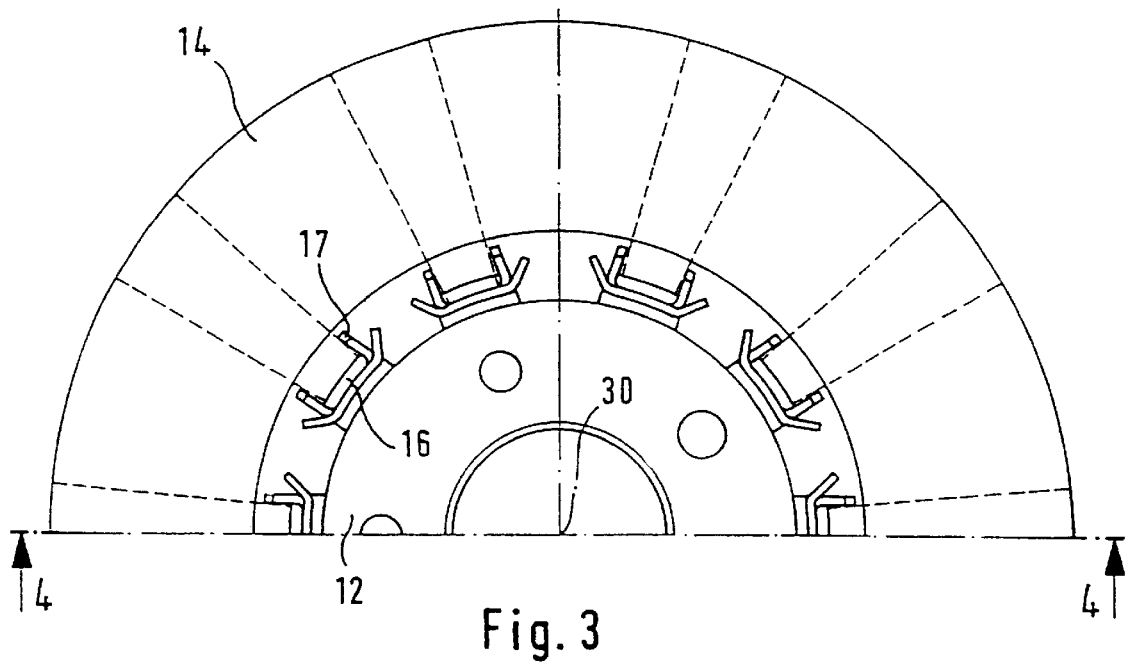
FIG. 3 shows a top view of a second embodiment of the brake disc according to the invention.
Figure 4:
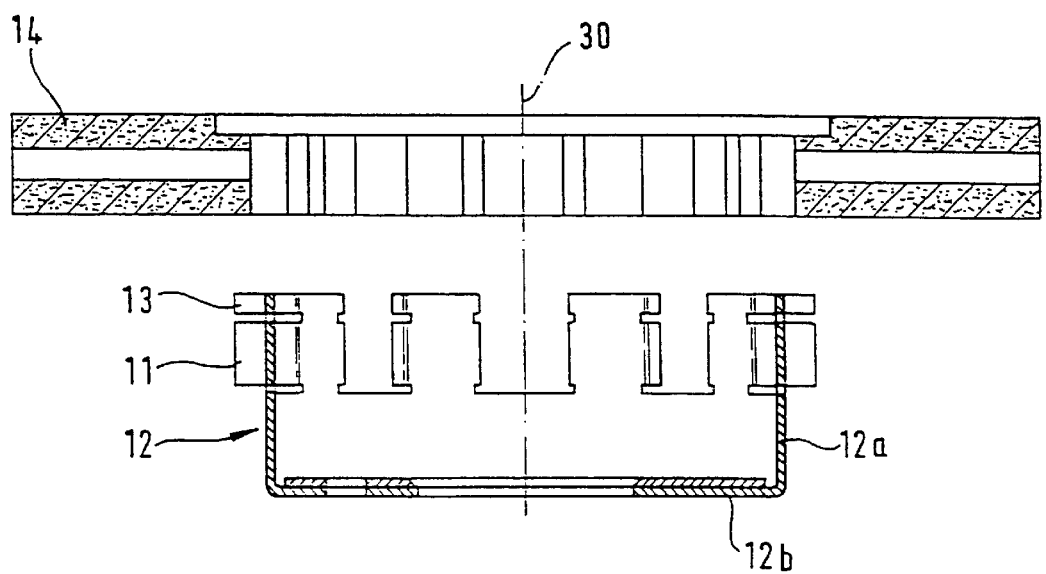
FIG. 4 shows a cross section along the line 4—4 of FIG. 3, friction ring and brake-disc chamber being illustrated in the not yet assembled state.

A second embodiment of the brake disc according to the invention is illustrated in FIGS. 3 and 4. This embodiment corresponds essentially to the first embodiment, whilst slots 17 are additionally formed as prolongations of the recesses 16 of the friction ring 14. In this case, the tongues or tabs 11 are shaped in such a way that they engage into these slots 17. It proves advantageous, at the same time, that the freedom of play, necessary for optimum torque transmission between friction ring 14 and brake-disc chamber 12, between the tabs 11 and the clearances formed in the friction ring can be ensured in a very simple way, since the slot width can be matched in a simple way to the low-tolerance sheet-metal thickness of the tabs 11. The unimpeded radial expansion of the brake-disc chamber in relation to the friction ring during heating is ensured by the slots 17 being made somewhat longer than the bent-round tongues 11, so that, when the tongues 11 engage into the slots 17, an interspace remains in the bottom region of the slots 17.

Figure 5:
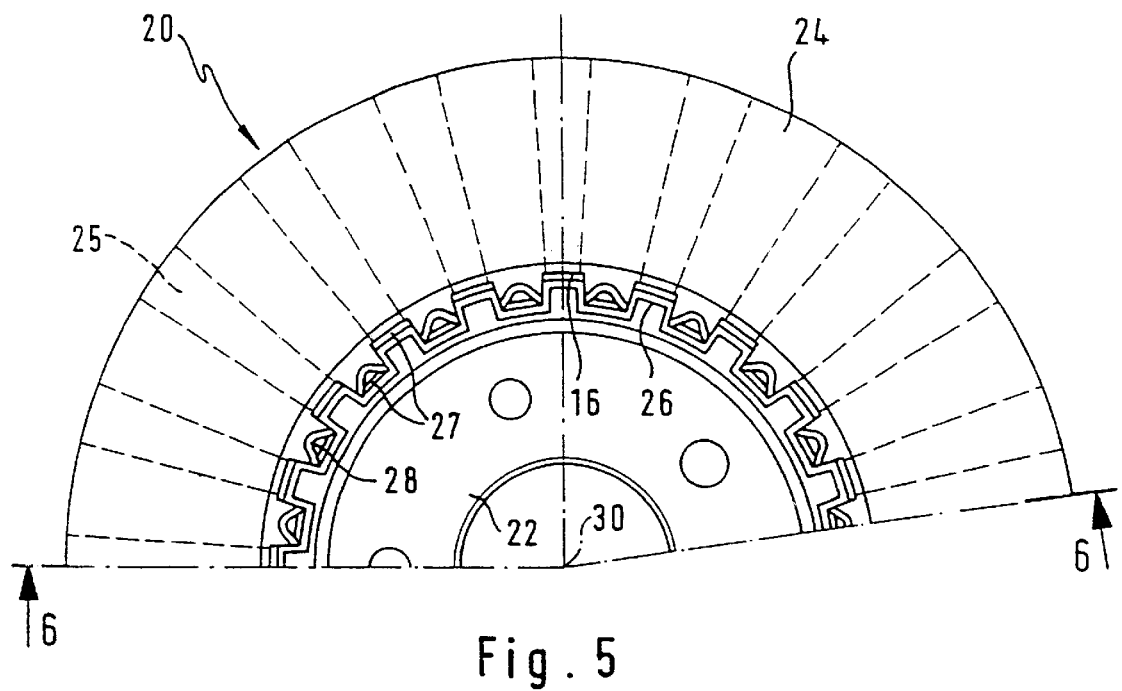
FIG. 5 shows a top view of a third embodiment of the brake disc according to the invention.
Figure 6:
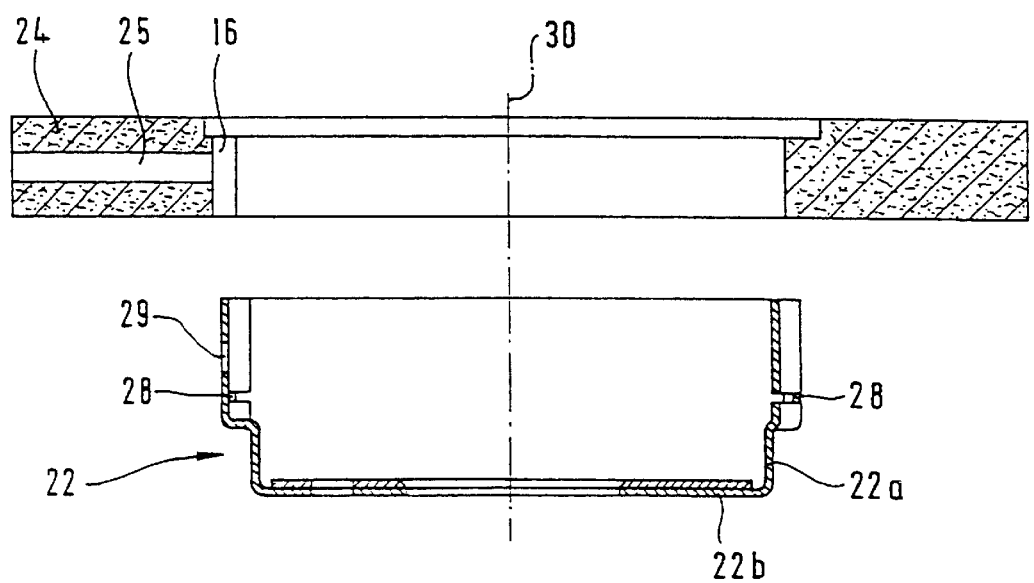
FIG. 6 shows a cross section along the line 6—6 of FIG. 5, friction ring and brake-disc chamber being illustrated in the not yet assembled state.

A third exemplary embodiment of a brake disc according to the invention is illustrated in FIGS. 5 and 6. Here, once again, the brake-disc chamber 22 and friction ring 24 are illustrated in FIG. 6 before they are mounted.

In this exemplary embodiment, the brake disc 20 has, in a corresponding way to the first and second preferred embodiments, a friction ring 24 and a brake-disc chamber 22 with a chamber wall 22a and with a bottom 22b, preferably made from the abovementioned materials.

The brake-disc chamber 22 has, on its chamber wall 22a, a regular closed toothed profile 26 of rectangular cross section produced, for example, by rolling or pressing. This toothed profile 26 engages into correspondingly shaped clearances 16 on the inside diameter of the friction ring 24, so that play-free positive torque transmission between brake-disc chamber 22 and friction ring 24 is ensured. Interspaces or gaps 27 between the toothed profile 26. and the respective bottoms of the recesses 16 of the friction ring 24 allow unimpeded radial thermal expansion of the brake-disc chamber 22 in relation to the friction ring 24.

The axial securing of the friction ring 24 on the brake-disc chamber 22 is ensured by means of so-called protrusions or pressed-out portions 28 which are introduced into the toothed-profile interspaces of the brake-disc chamber 22. In this case, the protrusions 28 are pressed into the brake-disc chamber 22 below and above the friction ring 24 arranged in its mounting position. Protrusions 28 can be seen in FIG. 6, which are expediently introduced into the toothed-profile interspaces of the brake-disc chamber 22 before the brake-disc chamber 22 and friction ring 24 are brought together. After the structural parts 22, 24 are brought together in such a way that the friction ring 24 rests on the protrusions 28, further protrusions 28 are pressed into the brake-disc chamber 22 above the friction ring 24, so that said friction ring 24 has axial play. These further protrusions 28 are not depicted in FIG. 6 in view of the mounting situation shown, in this figure.

FIG. 5, which shows the brake-disc chamber 22 and friction ring 24 in the assembled state, illustrates these further protrusions 28 which secure the friction ring 24 (upwards according to the perspective of FIG. 6). The axial play of the friction ring is thus capable of being set in a simple way by means of the positioning of the protrusions 28.

Ventilation ducts 25 are again illustrated by broken lines. They are formed with inlet orifices in the friction-ring clearances and with corresponding perforations 29 in the outer surface of the chamber toothing, thus ensuring an inflow of cooling air into the ventilation ducts 25.

What is claimed is:

1. Brake disc for motor vehicles, comprising:
   a bowl-shaped brake-disc chamber having a wall region and a bottom region, and
   a disc-shaped friction ring radially extending surrounding the brake-disc chamber coaxially with respect to a common mid-axis, the friction ring having clearances on its inner circumference into which clearances projections formed on the wall region of the brake-disc chamber engage for the play-free transmission of a torque acting on the friction ring to the brake-disc chamber,
   wherein the clearances formed in the friction ring have radially extending slot-like prolongations in respective bottom regions of the clearances, for accepting said projections, said slot-like prolongations and said projections being dimensioned such that a gap is formed between ends of said projection and bottoms of said slot-like prolongations to thereby accommodate unimpeded axial thermal expansion of the projections during operation of the brake disc.

2. Brake disc according to claim 1, wherein elastically deformable parts are formed on the wall region of the brake-disc chamber in order to secure the friction ring axially in relation to the brake-disc chamber.

3. Brake disc according to claim 2, wherein the projections and the elastically deformable parts take the form of tabs produced by stamping or cutting and subsequent bending-round from portions of the wall of the brake-disc chamber.

4. Brake disc according to claim 3, wherein the friction ring comprises non-metallic material and the brake-disc chamber comprises metallic material.

5. Brake disc according to claim 2, wherein the projections and the parts take the form of the tabs produced by stamping or cutting and subsequent bending-round from portions of the wall of the brake-disc chamber.

6. Brake disc according to claim 5, wherein the friction ring comprises non-metallic material and the brake-disc chamber comprises metallic material.

7. Brake disc according to claim 2, wherein the friction ring comprises non-metallic material and the brake-disc chamber comprises metallic material.

8. Brake disc according to claim 1, wherein the friction ring comprises non-metallic material and the brake-disc chamber comprises metallic material.

9. Method of making a brake disc according to claim 1, comprising forming tabs for the projections and the elastically deformable parts by stamping or cutting and subsequent bending-round from portions of the wall of the brake-disc chamber.

10. Brake disc assembly comprising:
    a bowl-shaped brake-disc chamber having a wall region and a bottom region, and
    a disc-shaped friction ring surrounding the brake-disc chamber coaxially with respect to a common mid-axis,
    wherein the friction ring includes clearances on its inner circumference,
    wherein the wall region of the brake disc chamber includes projections which engage in use in said clearances to provide for a circumferential play-free transmission of torque acting on the friction ring to the brake disc chamber, and
    wherein the projections and clearances are configured to have a gap therebetween to thereby accommodate unimpeded thermal expansion of the projections during operation of the brake disc.

11. A brake assembly according to claim 10, wherein elastically deformable parts are formed on the wall region of the brake-disc chamber in order to secure the friction ring axially in relation to the brake-disc chamber.

12. A brake assembly according to claim 11, wherein the projections and the elastically deformable parts take the form of tabs produced by stamped or cutting and subsequent bending-round from portions of the wall of the brake-disc chamber.

13. A brake assembly according to claim 10, wherein the friction ring comprises non-metallic material and the brake-disc chamber comprises metallic material.

14. Method of making a brake disc according to claim 10, comprising forming tabs for the projections and the elastically deformable parts by stamping or cutting and subsequent bending-round from portions of the wall of the brake-disc chamber.

* * * * *